United States Patent [19]

Couture

[11] 4,190,115
[45] Feb. 26, 1980

[54] FOR RELEASABLY COUPLING AGRICULTURAL ATTACHMENT TO SHANK

[76] Inventor: Richard B. Couture, Box 64, Ferland, Sask., Canada, S0H 1M0

[21] Appl. No.: 906,040

[22] Filed: May 15, 1978

[51] Int. Cl.² ............................................. A01B 15/00
[52] U.S. Cl. .................................. 172/753; 172/762; 403/358; 403/370; 403/374
[58] Field of Search ................ 172/193, 194, 724, 730, 172/749, 751, 753, 762, 763; 403/358, 370, 374

[56] References Cited
U.S. PATENT DOCUMENTS

| | | | |
|---|---|---|---|
| 928,690 | 7/1909 | Paul | 172/753 X |
| 1,027,129 | 5/1912 | Henry | 403/370 X |
| 1,345,209 | 6/1920 | Martin | 172/753 X |
| 1,605,861 | 11/1926 | Snyder et al. | 172/762 |
| 2,469,044 | 5/1949 | Lane | 172/194 |
| 3,561,798 | 2/1971 | Redfern | 403/370 X |

*Primary Examiner*—Richard T. Stouffer
*Attorney, Agent, or Firm*—Daniel Jay Tick

[57] ABSTRACT

A farm machine coupling utilizes a wedge having an internally threaded bore formed therein for accommodating a bolt threadedly coupled in a coupling member of a shank affixed to a farm machine. When the coupling end of an agricultural attachment for performing an agricultural task is positioned on the free end of the shank and the wedge is positioned in the rectangular sleeve type coupling end next-adjacent the shank and the bolt coupled in the coupling member is threadedly coupled in the wedge, the attachment is removably tightenable on the shank via the bolt and the wedge.

2 Claims, 3 Drawing Figures

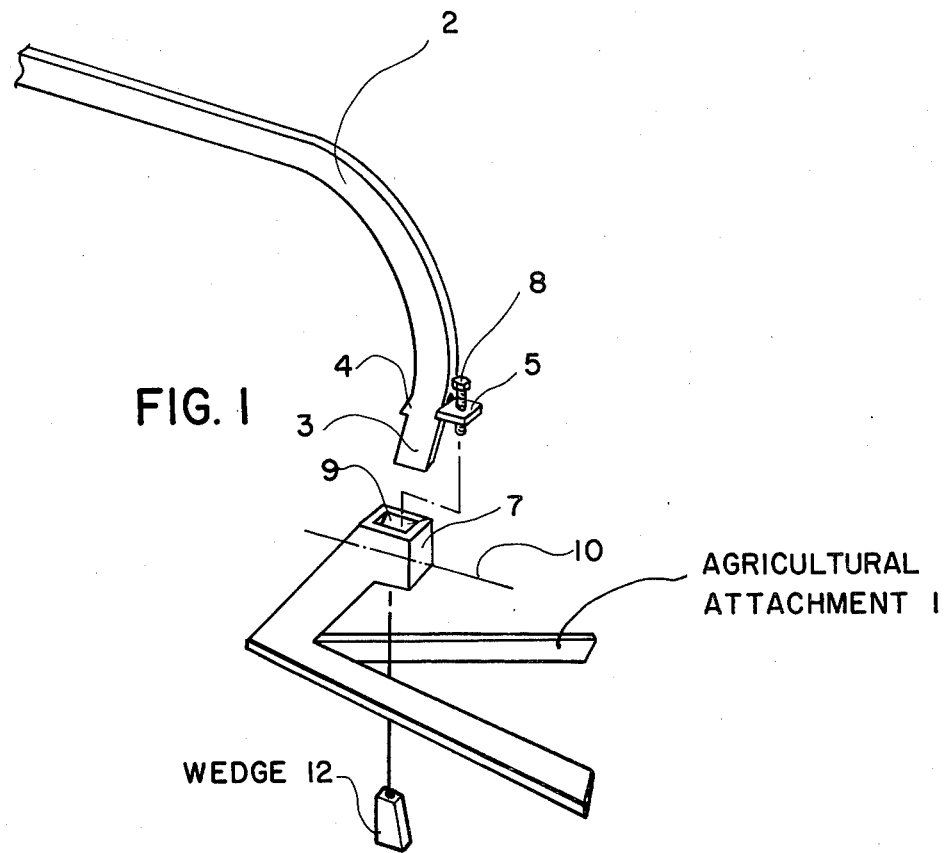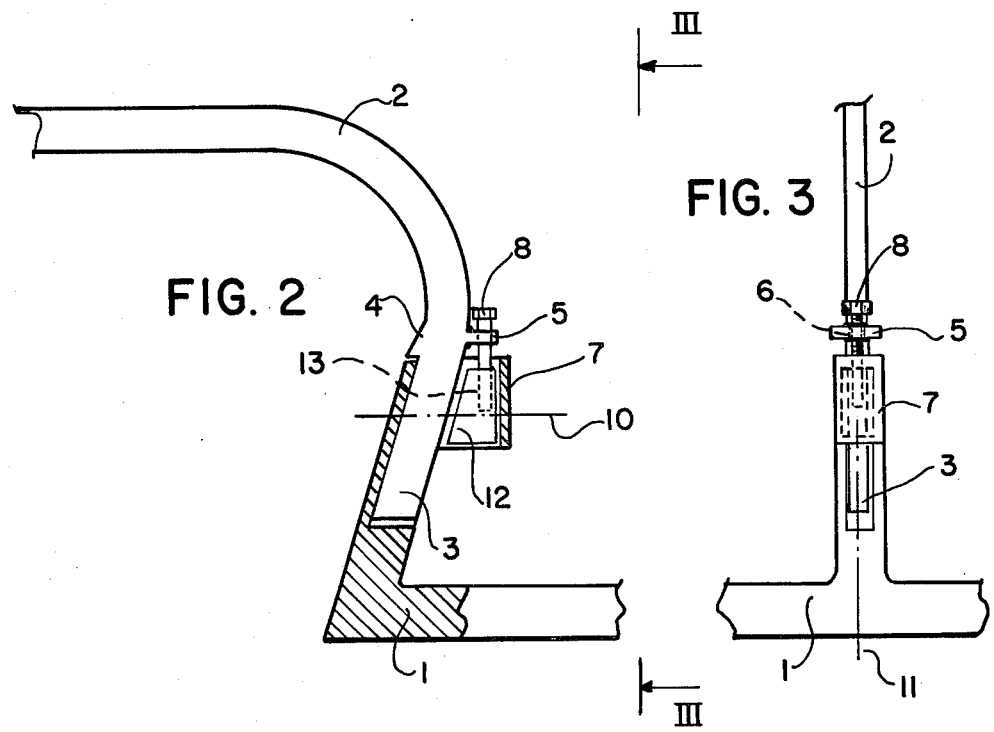

FOR RELEASABLY COUPLING AGRICULTURAL ATTACHMENT TO SHANK

BACKGROUND OF THE INVENTION:

The present invention relates to a farm machine coupling. More particularly, the invention relates to a farm machine coupling for releasably coupling an agricultural attachment to a farm machine.

Farm machine couplings are disclosed in the following United States patents. U.S. Pat. No. 1,528,443, issued Mar. 3, 1925 to McGee, U.S. Pat. No. 2,190,166, issued Feb. 13, 1940 to Simmons, Sr., U.S. Pat. No. 2,469,044, issued May 13, 1949 to Lane, U.S. Pat. No. 2,847,737, issued Nov. 8, 1949 to Skinner, U.S. Pat. No. 2,715,865, issued Aug. 23, 1955 to Dennewitz and U.S. Pat. No. 3,770,066, issued Nov. 6, 1973 to Young.

Objects of the invention are to provide a farm machine coupling of simple structure, which is inexpensive in manufacture, secured and released with facility, convenience and rapidity, and functions efficiently, effectively and reliably to releasably couple an agricultural attachment to a farm machine.

BRIEF DESCRIPTION OF THE DRAWINGS:

In order that the invention may be readily carried into effect, it will now be described with reference to the accompanying drawings, wherein:

FIG. 1 is a perspective exploded view of an embodiment of the farm machine coupling of the invention;

FIG. 2 is a side view, on an enlarged scale, partly cutaway and partly in section, of the embodiment of FIG. 1 in secured condition; and FIG. 3 is a view, taken along the lines III—III, of FIG. 2.

DETAILED DESCRIPTION OF THE INVENTION:

The farm machine coupling of the invention releasably couples an agricultural attachment 1 to a farm machine such as, for example, a farm tractor, or the like.

The farm machine coupling of the invention comprises a curved rectangular rod-like shank 2 affixed to a farm machine (not shown in the FIGS.) and having a free end 3 spaced from said farm machine. The shank 2 is substantially linear in the area of its free end 3, as shown in the FIGS., and has a lip 4 ( FIGS. 1 and 2) projecting from one side thereof in the area of its free end. The shank 2 has a coupling member 5 projecting from the opposite side thereof from the lip 4, as shown in the FIGS. The coupling member 5 has an internally threaded bore 6 formed therethrough, as shown in FIG. 3.

The agricultural attachment 1 may comprise any suitable attachment for performing an agricultural task such as, for example, a scythe or grass-cutting implement. The attachment 1 has a coupling end 7 of rectangular sleeve-type configuration accommodatable on the shank 2 with additional spaces therein, as shown in FIG. 2, at the free end 3 of said shank, up to the projecting lip 4 and the coupling member 5, as shown in FIGS. 2 and 3.

A bolt 8 is threadedly coupled in the bore 6 of the coupling member 5 of the shank 2.

The coupling end 7 of the agricultural attachment 1 has a hole 9 formed therethrough (FIG. 1) which is rectangular in a cross-sectional plane 10 extending substantially perpendicularly through the free end 3 of said shank, as shown in FIGS. 1 and 2. The hole 9 through the coupling end 7 of the agricultural attachment 1 is trapezoidal in a plane 11 (FIG. 3) perpendicular to the plane 10 and tapers downward in a direction away from the free end 3, as shown in FIG. 2.

A wedge 12 (FIGS. 1 and 2) has an internally threaded bore 13 (FIG. 2) formed therein for accommodating the bolt 8. Thus, when the coupling end 7 of the agricultural attachment 1 is positioned on the free end 3 of the shank 2 in abutment with the lip 4, as shown in FIGS. 2 and 3, and the wedge 12 is positioned in the hole 9 of said coupling end next-adjacent said shank, as shown in FIGS. 2 and 3, and the bolt 8 coupled in the coupling member 5 of said shank is threadedly coupled in said wedge (FIGS. 2 and 3), said wedge is tightly securable in said hole and said agricultural attachment is removably tightenable on said shank via said bolt and said wedge.

While the invention has been described by means of a specific example and in a specific embodiment, I do not wish to be limited thereto, for obvious modifications will occur to those skilled in the art without departing from the spirit and scope of the invention

I claim:

1. A coupling for releasably coupling an agricultural attachment to a shank, said coupling comprising a curved rectangular rod-like shank having a free end, said shank being substantially linear in the area of its free end and having a lip projecting from one side thereof in the area of its free end and a coupling member projecting from the opposite side thereof, said coupling member having an internally threaded bore formed therethrough;

an agricultural attachment for performing an agricultural task, said attachment having a coupling end of rectangular sleeve type configuration accommodatable on said shank with additional space therein at the free end thereof up to said projecting lip and coupling member;

a bolt threadedly coupled in the bore of the coupling member of the shank; and a wedge having an internally threaded bore formed therein for accommodating said bolt whereby when the coupling end of said attachment is positioned on the free end of said shank in abutment with said lip and said wedge is positioned in the hole of said coupling end next-adjacent said shank and said bolt coupled in said coupling member is threadedly coupled in said wedge, said attachment is removably tightenable on said shank via said bolt and said wedge.

2. A coupling as claimed in claim 1, wherein the sleeve type configuration coupling end of said attachment has a hole therethrough which is rectangular in a cross-sectional plane extending substantially perpendicularly through the free end of said shank and which is trapezoidal in a plane perpendicular to said plane and tapers downward in a direction away from said free end whereby said wedge is tightly securble in said hole.

* * * * *